United States Patent
Bischof

(10) Patent No.: US 6,426,479 B1
(45) Date of Patent: Jul. 30, 2002

(54) NOZZLE SYSTEM FOR LASER BEAM CUTTING

(75) Inventor: Dietmar Bischof, Bermatingen (DE)

(73) Assignee: LT Ultra-Precision-Technology GmbH, Aftholderberg (DE)

( * ) Notice: Subject to any disclaimer, the term of this patent is extended or adjusted under 35 U.S.C. 154(b) by 0 days.

(21) Appl. No.: 09/445,387

(22) PCT Filed: Jun. 10, 1998

(86) PCT No.: PCT/EP98/03511

§ 371 (c)(1),
(2), (4) Date: Jan. 3, 2000

(87) PCT Pub. No.: WO98/56534

PCT Pub. Date: Dec. 17, 1998

(30) Foreign Application Priority Data

Jun. 13, 1997 (DE) .......................... 197 25 256

(51) Int. Cl.[7] .............................................. B23K 26/14
(52) U.S. Cl. ............................. 219/121.67; 219/121.84; 219/121.5; 219/121.83
(58) Field of Search ....................... 219/121.67, 121.84, 219/121.5, 121.83, 121.6, 121.63, 121.72

(56) References Cited

U.S. PATENT DOCUMENTS 4,090,572 A    5/1978  Welch
5,609,781 A *  3/1997  Kaga et al. ............ 219/121.84
5,786,561 A *  7/1998  Zefferer et al. ........ 219/121.84

FOREIGN PATENT DOCUMENTS

| DE | 3630127 | 3/1987 |
|----|---------|--------|
| DE | 4234788 | 4/1994 |
| DE | 4437795 | 4/1995 |
| DE | 4402000 | 7/1995 |
| EP | 0294324 | 12/1988 |
| WO | 9500282 | 1/1995 |

OTHER PUBLICATIONS

Patent Abstracts of Japan, vol. 011, No. 158 (M–591), May 22, 1987—JP 61 289992 A (Inoue Japaz Res Inc.) Dec. 19, 1986.

* cited by examiner

*Primary Examiner*—M. Alexandra Elve
(74) *Attorney, Agent, or Firm*—Bachman & LaPointe, P.C.

(57) ABSTRACT

A nozzle arrangement for laser beam cutting, having a nozzle body surrounding a focused laser beam and with a passage opening for the laser beam, and having a nozzle sleeve which surrounds the nozzle body and forms with the nozzle body an annular gap which on the one hand has an inlet for a gas, and on the other hand has an annular opening assigned to the passage openings, wherein there is provided in the annular gap a nozzle-like constriction whose width is increased upstream and downstream of the constriction.

9 Claims, 2 Drawing Sheets

NOZZLE SYSTEM FOR LASER BEAM CUTTING

BACKGROUND OF THE INVENTION

The invention relates to a nozzle arrangement for laser beam cutting, having a nozzle body surrounding a focused laser beam and with a passage opening for the laser beam, and having a nozzle sleeve which surrounds the nozzle body and forms with the nozzle body an annular gap which on the one hand has an inlet for a gas, and on the other hand has an annular opening assigned to the passage opening.

In order, for example, to be able to cut workpieces at a high operating speed by means of a laser beam, it is known to make use, for the purpose of blowing out the material from the cutting groove, of a cutting gas which is fed at high speed. The cutting gas speed is in the ultrasonic region in this case. DE 36 30 127 A1 discloses such a nozzle arrangement for laser beam cutting which has a frustoconical nozzle body which is adapted to the focused laser beam, surrounds the latter and has a passage opening for the laser beam, and which has a nozzle sleeve which surrounds the nozzle body concentrically and forms with the nozzle body a plurality of gas flow channels which are connected to a gas source and open on the workpiece side from the passage bore for the laser beam into a combining chamber which is formed jointly by the nozzle body and by the nozzle sleeve and from which a single gas jet flows out through an exit bore at supersonic speed given appropriate dimensioning of the pressure of the gas.

Furthermore, there is known from DE 44 02 000 A1 a nozzle arrangement of the above-named type in the case of which the exit cross section of the exit bore is virtually equal to the transitional cross section of the annular gap to the exit bore. In this case, the transitional cross section of the annular gap is to be dimensioned such that the gas is accelerated at most to the speed of sound.

EP 0 294 324 describes a laser processing tool in which the cooling of the nozzle leads an additional cooling gas outside the nozzle up to the nozzle tip. In this case, a concentric annular chamber is formed around the outside of the conventional nozzle, in which there is also arranged a sensor device which is likewise cooled. A disadvantage of this is that supplying cooling gas at very high operating speeds leads to strong eddies at the nozzle exit, resulting in a rapid decrease in the speed of the gas. Moreover, such eddies lead to impairment of the result of cutting and, in particular, to impairment of the surfaces.

SUMMARY OF THE INVENTION

It is the object of the present invention to create a nozzle arrangement of the above-named type in which both the assembly of the nozzle arrangement and its fitting on a laser head is facilitated, and the guidance of the protective gas flow is improved.

The achievement of this object is promoted by providing a nozzle-like constriction in the annular gap.

This nozzle-like constriction has the advantage of achieving inside the annular gap a Venturi effect which leads to a substantial increase in the rate of flow. If appropriate, in this case the rate of flow can be greater than the speed of sound. This ensures that cutting slag still adhering in the cutting gap is blown away, thereby substantially improving the quality of the cutting gap.

There is also simultaneously a quicker cooling of the cutting gap, and this likewise leads to an improvement in the surface. In addition, it is ensured that oxygen is prevented from access to the cutting gap, so that oxidation is prevented when cutting metal.

A further substantial advantage resides in the fact that the use of gas is reduced although there is at the same time an increase in the speed of the gas. The pressure at which the gas is fed can thereby likewise be reduced.

As a rule, it would appear to be advisable for the constriction to be of annular configuration. This can be achieved chiefly either by crowning the outer surface of the nozzle body, or else by having a rampart-like elevation project from an inner surface of the nozzle sleeve.

The constriction should be configured such that a width of the annular gap is increased upstream and downstream of the constriction. This means that the gas expands slightly downstream of the constriction.

The assembly of the nozzle arrangement is facilitated, on the one hand, by providing spacers in the annular gap between the nozzle body and nozzle sleeve. These are preferably in this case longitudinally running ribs which are mounted on the outer surface of the nozzle body and/or the inner surface of the nozzle sleeve, or are formed from these surfaces.

Also serving the ease of assembly is a union nut by means of which the nozzle arrangement can be fixed on a laser head, for example a support sleeve. An inner flange of the union nut in this case strikes an annular shoulder of the nozzle sleeve, while the union nut as a whole is screwed on an external thread of the support sleeve.

BRIEF DESCRIPTION OF THE DRAWINGS

Further advantages, features and details of the invention emerge from the following description of preferred exemplary embodiments and with the aid of the drawing, in which.

DETAILED DESCRIPTION OF PREFERRED EMBODIMENTS

Figures 1, 2:
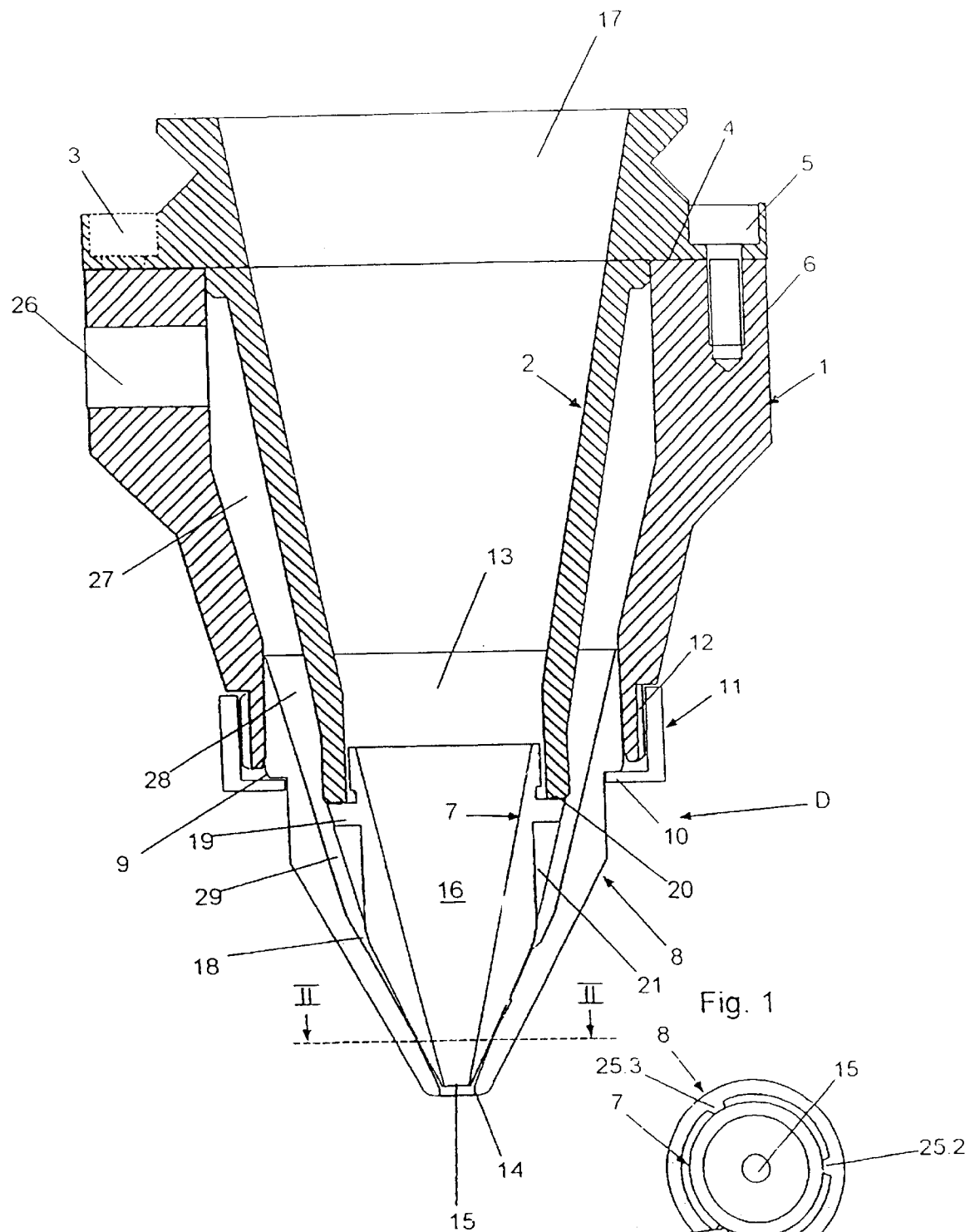
FIG. 1 shows a cross section through a part of a laser head.
FIG. 2 shows a cross section through a nozzle arrangement of the laser head in accordance with FIG. 1, along the line II—II.
Figure 3:
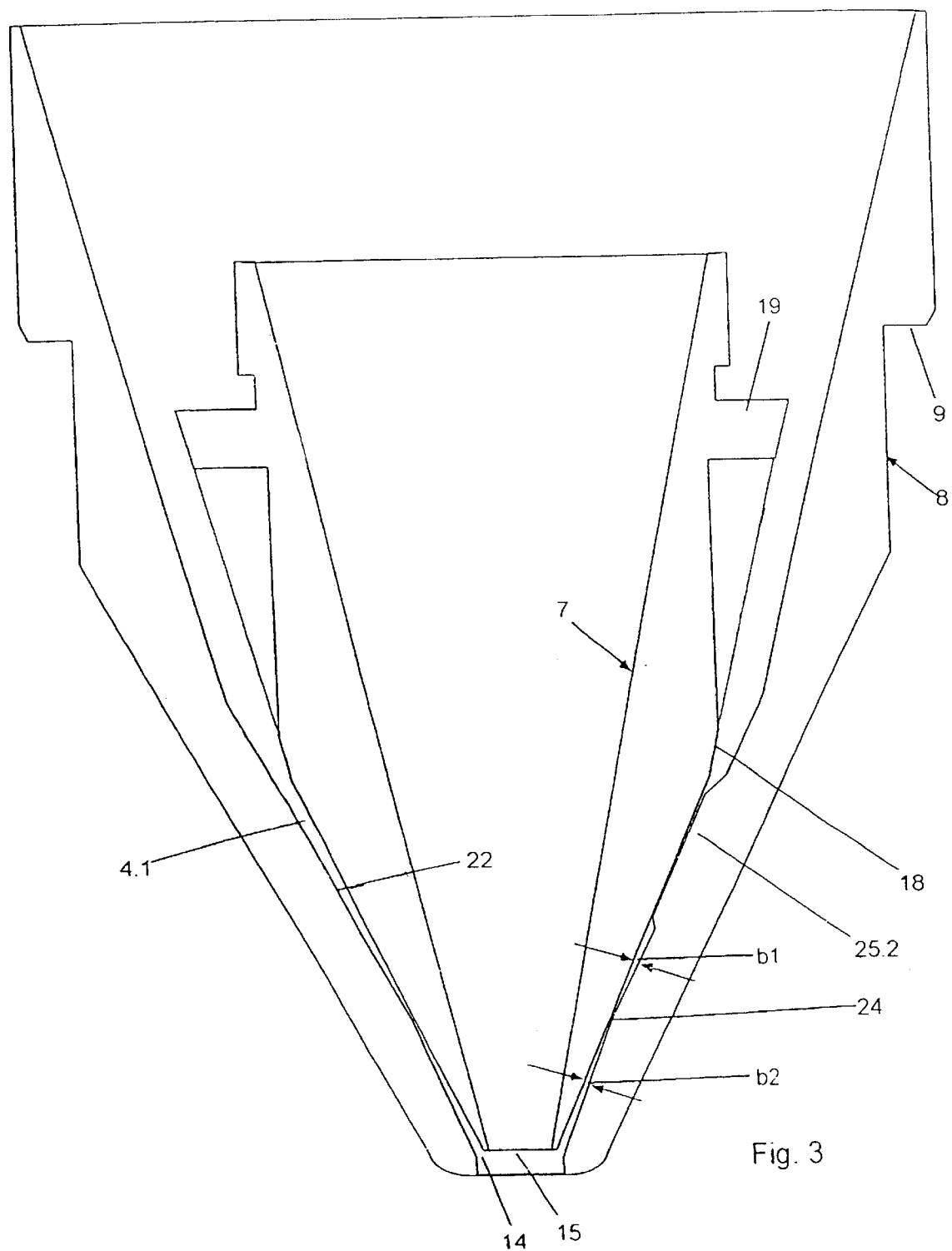
FIG. 3 shows a cross section, represented in an enlarged fashion, through a nozzle arrangement according to the invention on the laser head in accordance with FIG. 1.

Shown in FIG. 1 is a support sleeve 1 of a laser head which embraces an inner sleeve 2. In this case, the inner sleeve 2 forms an annular flange 3 against which an upper edge 4 of the support sleeve 1 strikes. The support sleeve 1 is fixed on this annular flange 3 via bolts 5, the bolts 5 being inserted in threaded bores 6 of the support sleeve 1.

A nozzle arrangement D is fixed on the support sleeve 1. This nozzle arrangement D has a nozzle body 7 which is embraced at least partially by a nozzle sleeve 8. The nozzle sleeve 8 has an annular shoulder 9 against which an inner flange 10 of a union nut 11 presses, the union nut 11 being screwed on an external thread 12 of the support sleeve 1.

The nozzle sleeve 8 has a conically shaped inner surface 13 which tapers to an annular opening 14. A passage opening 15 for a laser beam (not shown in more detail) in the nozzle body 7 is assigned to this annular opening 14.

Adjoining the passage opening 15 in the nozzle body 7 is a frustoconical inner surface 16 which at the other end to the passage opening 15 merges into a likewise widening opening 17 in the inner sleeve 2. The opening 17 and an opening in the nozzle body 7 which is surrounded by the inner surface 16 are configured such that a laser beam (not shown in more detail) is led through the opening 17, through the nozzle body 7 and through the passage opening 15.

Integrally formed on an outer surface 18 of the nozzle body 7 near the transition to the opening 17 is an outer flange 19 which is supported in the position of use against an annular edge 20 of the inner sleeve 2. Recessed below the outer flange 19 into the outer surface 18 of the nozzle body 7 are cutouts 21 which serve, inter alia, to lead a protective gas flow. Starting below the cutouts 21 is an annular gap 23 formed between the outer surface 18 and an inner surface 22 of the nozzle sleeve 8. Provided in this annular gap 23 is a constriction 24 which is configured as a rampart-like and annular inner swelling of the inner surface 22. A width $b_1$ and a width $b_2$ of the annular gap 23 upstream and downstream of the constriction 24 are greater than the width of the constriction 24 itself.

Furthermore, longitudinally running spacers which are formed as ribs rise from the inner surface 22 of the nozzle sleeve 8. It is to be seen in FIG. 2 that three such spacers 25.1, 25.2 and 25.03 are provided.

The mode of operation of the present invention is as follows:

The nozzle arrangement D can be attached to the laser head in a simple way by means of the union nut 11.

In this case, the nozzle body 7 is inserted into the nozzle sleeve 8 by the spacers 25.1, 25.2 and 25.3 undertaking to center the nozzle body in the nozzle sleeve effectively and exactly.

During insertion of the nozzle arrangement D into the laser head, the outer flange 19 of the nozzle body 16 strikes the annular edge 20, as a result of which the entire nozzle arrangement D is centered and held.

During laser beam cutting, cutting gas is introduced via an inlet opening 26 in the support sleeve 1 into an annular channel 27 between the support sleeve 1 and inner sleeve 2. This protective gas then flows further from the annular channel 27 into a channel section 28 which is formed between the inner surface 13 of the nozzle sleeve 8 and the inner sleeve 2. Thereafter, a transition of the gas in a gap section 29 which tapers to the annular gap 23 and in whose region the cutouts 21 are also situated takes place. The latter serve for mounting the nozzle body 7.

The gas now flows into the annular gap 23, a substantial acceleration of the gas speed occurring due to the continuous tapering of the annular channel to the annular gap 23. The constriction 24 in the annular gap 23 causes a further substantial increase in the gap speed, the gas being able to expand downstream of the constriction in the annular gap, which once again widens. A Venturi effect is achieved in the annular gap 23 by means of the constriction 24.

The gas exits at a very high speed from the annular opening 14, and strikes the workpiece (not shown in more detail) to be processed. There, the gas blows out and cools a cutting groove and prevents the feeding of oxygen, with the result that, for example in the case of metal processing, the metal is not oxidized. The gas is formed as an annular jet.

What is claimed is:

1. A nozzle arrangement for laser beam cutting, which comprises: a nozzle body surrounding a focused laser beam, including at least one passage opening for the laser beam; a nozzle sleeve which surrounds the nozzle body, said nozzle sleeve having an inner surface and said nozzle body having an outer surface; an annular gap formed between the inner surface of the nozzle sleeve and the outer surface of the nozzle body, said annular gap having on the one hand an inlet for gas, and on the other hand an annular opening communicating with said passage opening; wherein there is provided in the annular gap a nozzle-like constriction whose width is increased in the annular gap upstream and in the annular gap downstream of said constriction.

2. The nozzle arrangement according to claim 1, wherein said constriction is of annular configuration.

3. The nozzle arrangement according to claim 1, wherein a rampart-like elevation is formed on at least one of said inner surface of the nozzle sleeve and said outer surface of the nozzle body.

4. The nozzle arrangement according to claim 1, including rib-shaped spacers arranged in the annular gap.

5. The nozzle arrangement according to claim 4, wherein said spacers are integrally formed in one piece on at least one of the outer surface of the nozzle body and the inner surface of the nozzle sleeve.

6. The nozzle arrangement according to claim 1, wherein the nozzle sleeve is fixed on a laser head by means of a union nut.

7. The nozzle arrangement according to claim 4, including three of said rib-shaped spacers.

8. The nozzle arrangement according to claim 4, including a plurality of said rib-shaped spacers substantially equally spaced from each other to center the nozzle body in the nozzle sleeve.

9. The nozzle arrangement according to claim 1, including at least one cutout in said outer surface of said nozzle body upstream of said annular gap.

* * * * *